US008672354B2

(12) United States Patent
Kim et al.

(10) Patent No.: US 8,672,354 B2
(45) Date of Patent: Mar. 18, 2014

(54) UNDERBODY FOR ELECTRIC VEHICLE

(75) Inventors: Jae-Hyun Kim, Gwangyang-si (KR); Hong-Woo Lee, Gwangyang-si (KR); Hyoun-Young Lee, Gwangyang-si (KR); Yeon-Sik Kang, Gwangyang-si (KR)

(73) Assignee: POSCO (KR)

(*) Notice: Subject to any disclaimer, the term of this patent is extended or adjusted under 35 U.S.C. 154(b) by 0 days.

(21) Appl. No.: 13/824,435

(22) PCT Filed: Dec. 27, 2011

(86) PCT No.: PCT/KR2011/010147
§ 371 (c)(1),
(2), (4) Date: Mar. 18, 2013

(87) PCT Pub. No.: WO2012/091404
PCT Pub. Date: Jul. 5, 2012

(65) Prior Publication Data

US 2013/0175829 A1 Jul. 11, 2013

(30) Foreign Application Priority Data

Dec. 28, 2010 (KR) ........................ 10-2010-0137283

(51) Int. Cl.
*B62D 21/00* (2006.01)

(52) U.S. Cl.
USPC ..................... 280/783; 180/68.5; 296/193.07; 296/187.08

(58) Field of Classification Search
USPC ........ 280/783, 781, 782; 296/193.07, 187.08; 180/68.5
See application file for complete search history.

(56) References Cited

U.S. PATENT DOCUMENTS

| | | | | |
|---|---|---|---|---|
| 4,174,014 | A * | 11/1979 | Bjorksten | 180/68.5 |
| 5,501,289 | A * | 3/1996 | Nishikawa et al. | 180/68.5 |
| 5,704,644 | A * | 1/1998 | Jaggi | 280/796 |
| 6,631,775 | B1 * | 10/2003 | Chaney | 180/68.5 |
| 6,905,138 | B2 * | 6/2005 | Borroni-Bird et al. | 280/783 |
| 7,051,825 | B2 * | 5/2006 | Masui et al. | 180/68.5 |
| 7,503,585 | B2 * | 3/2009 | Hashimura et al. | 280/782 |
| 7,690,686 | B2 * | 4/2010 | Hashimura et al. | 280/782 |
| 7,886,861 | B2 * | 2/2011 | Nozaki et al. | 180/232 |
| 8,052,206 | B2 * | 11/2011 | Wang et al. | 296/193.07 |
| 8,393,427 | B2 * | 3/2013 | Rawlinson | 180/68.5 |
| 2006/0001251 | A1 * | 1/2006 | Ruppert et al. | 280/783 |

FOREIGN PATENT DOCUMENTS

| | | | |
|---|---|---|---|
| JP | 07052658 | A | 2/1995 |
| JP | 07108956 | A | 4/1995 |
| JP | 2006182295 | A | 7/2006 |
| JP | 2007106320 | A | 4/2007 |

* cited by examiner

*Primary Examiner* — Toan To

(74) *Attorney, Agent, or Firm* — The Webb Law Firm

(57) ABSTRACT

An underbody for an electric vehicle configured as an electric vehicle lower body includes a multiply divided battery mounting portion and an underbody portion. The multiply divided battery mounting portion enables multiply divided and selective mounting of batteries, and forms a portion of the underbody. The underbody portion is connected to the battery mounting portion and forms another portion of the underbody.

13 Claims, 7 Drawing Sheets

UNDERBODY FOR ELECTRIC VEHICLE

TECHNICAL FIELD

The present invention relates to an underbody for an electric vehicle, configured as a lower body of an electric vehicle, and more particularly, to an underbody for an electric vehicle, which not only provides a lighter underbody, but also securely maintains its structural rigidity, enables the selective mounting of multiple separate batteries thereon, so as to improve travel range between battery charges, and which enables batteries to be suitably mounted according to the conditions in which the vehicle will travel.

BACKGROUND ART

In consideration of the future of the environment, there has recently been much attention focused on environmentally friendly electric vehicles, and research and development focused on electric vehicles has consequently been carried out by automobile manufacturers and the like.

Battery design and R&D is focused on electric vehicles that include features such as internal batteries, receive power from an external source when the batteries require charging, and convert the electrical energy stored in the batteries to mechanical force to drive the vehicles.

However, electric vehicles that have been developed to date, in terms of battery efficiency, have had difficulty traveling beyond a distance of about 200 km on a single (full) charge.

As a method of overcoming this limited travel range accompanying a single-charge, research into lightening the body or underbody of an electric vehicle, in order to increase the travel range thereof, has been conducted.

For example, there have been efforts in the related art to lighten an underbody by replacing the underbody material with plastic or aluminum, or making certain portions of a steel underbody high-strength, in order to reduce the material thickness and achieve lighter weight.

However, when plastic materials or aluminum are used in the related art, a significantly greater amount of $CO_2$ is discharged throughout the overall product life, from manufacturing to recycling. In particular, in the case of plastic used in a body, it may be difficult to recycle, its strength is difficult to maintain, and its cost is high, as compared to steel.

Also, in related art inventions, in which portions of a steel material underbody are made high-strength to reduce material thickness, there is the limitation of an overall reduction in underbody strength against bending and twisting.

Ultimately, a reduction in underbody strength against bending and twisting fundamentally results in deteriorated ride quality and handling of an electric vehicle.

Another technique for increasing the travel range of an electric vehicle is to enable a battery mounted (installed) in an electric vehicle to be easily replaceable at a service station or other facility.

However, while not shown in a separate drawing, most related art electric vehicles have structures in which the battery must be entirely replaced, which requires the use of a car hoist to raise the vehicle and replace the battery or a facility that allows the battery to be replaced from a recess in the ground below the vehicle.

Currently, the replacement of an electric vehicle battery requires complex equipment and cannot be easily performed by a vehicle driver.

Also, even if a desired travel distance is 100 km or less after charging an electric vehicle, all batteries must be mounted and completely charged for use, which involves having to mount and carry more batteries than necessary.

In instances in which electric vehicles are used for commuting, even in the case that a battery charge capacity is only required for short range travel, because a battery (pack) must always be carried in a conventional electric vehicle, this gives rise to the limitation of reduced travel efficiency as a result of more electricity consumed in order to overcome the greater load from the increased weight of the vehicle.

SUMMARY OF THE INVENTION

An aspect of the present invention provides an underbody for an electric vehicle that constitutes the lower body of an electric vehicle, while having the strength to resist bending and twisting and good performance in terms of resistance to front, rear, and side impacts.

Another aspect of the present invention provides an underbody for an electric vehicle which is a lightened structure that enables the selective mounting and replacement of multiple separate batteries, and provides the financial benefit of lower vehicle maintenance costs by enabling the loaded battery weight to be reduced in accordance with the travel conditions of the vehicle.

According to an aspect of the present invention, there is provided an underbody for an electric vehicle, including: a multiply divided battery mounting portion enabling multiply divided and selective mounting of batteries, and forming a portion of the underbody; and an underbody portion connected to the battery mounting portion and forming another portion of the underbody.

According to another aspect of the present invention, there is provided an underbody for an electric vehicle, including: a floor portion; and a reinforcing underbody portion connected to the floor portion for reinforcing strength of the underbody, and including at least a partial expanding portion.

The underbody portion may be a reinforcing underbody portion including at least a partial extending portion.

The floor portion may be a multiply divided battery mounting portion.

The multiply divided battery mounting portion may include: an upper floor member and a lower floor member defining a battery sliding mounting space; and a plurality of floor cross members bonded between the upper and lower floor members with predetermined intervals therebetween, and defining at least one battery mounting space, for maintaining strength.

The floor cross members bonded between the upper and lower floor members may be formed to have at least four sides in a cross-section thereof, for maintaining strength.

The underbody may further include a guide portion for guiding a battery sliding mount on at least one of the upper floor member and the lower floor member or the floor cross members.

The upper floor member and the lower floor member may be formed as divided body portions or integrated body portions.

The underbody may further include a connecting member bonded between the divided body portions.

The battery mounting space may be formed to accommodate the mounting of 3 to 5 batteries therein.

A plurality of batteries may be mounted in the battery mounting space of the multiply divided battery mounting portion, and at least one of the batteries may be fixed for providing strength reinforcement between the floor members.

The underbody may further include at least one replaceable battery and one multipurpose fixed battery mounted on a multiply divided battery mounting portion that is a rearward floor portion of the underbody portion or a reinforcing underbody portion.

The reinforcing underbody portion may include a front and rear side member bonded to and extending from both sides of a multiply divided battery mounting portion provided as a floor portion, and the front and rear side member may include an extending portion formed on at least a portion thereof for reinforcing strength.

The side member may be bonded to either side floor cross member provided on the multiply divided battery mounting portion provided as a floor portion, and comprises a curved portion for reinforcing strength against bending and a horizontal portion for mounting auxiliary components, and the extending portion may be provided at the bonding portion of the floor cross member.

The underbody may further include one or more cross members connected to the front side member and the rear side member for reinforcing respective strength thereof against twisting, wherein the front cross member may be provided as a motor mounting member.

The front side member may include: a pillar member bonded thereto and having a side upper member bonded thereto; and a dash cross side member further connected between the pillar member and the front side member.

The underbody may further include a shock absorber member and side connecting member bonded between the side upper member and the front side member.

The members included in the underbody may be formed as shaped steel members having hollow interiors for reduced weight, and may be selectively hydro formed.

It should be noted that the above description does not cover all the features of the present invention. Various features of the present invention and advantages and effects arising therefrom will be understood in more detail with reference to the detailed embodiments below.

An underbody constituting the lower body of an electric vehicle according to the present invention has strength to resist bending or twisting thereof and has good performance against front, rear, and side impacts.

In addition, an underbody for an electric vehicle of the present invention is provided as a lightened structure, to allow for selective mounting and replacement of multiple separate batteries, and to allow the loaded weight of batteries to be reduced according to the travel conditions of a vehicle, in order to ultimately reduce vehicle maintenance costs.

According to the present invention, the mounting of multiple separate batteries is possible, and the batteries are divided into replaceable and fixed batteries, with the fixed batteries provided between floor members with a strength reinforcing member, so as to further improve strength.

Also, an underbody for an electric vehicle may be designed to fit the mounting structure for auxiliary components configuring an electric vehicle in order to improve overall assemblability.

BRIEF DESCRIPTION OF DRAWINGS

The above and other aspects, features and other advantages of the present invention will be more clearly understood from the following detailed description taken in conjunction with the accompanying drawings, in which.

DETAILED DESCRIPTION OF THE INVENTION AND BEST MODE

Exemplary embodiments of the present invention will now be described in detail with reference to the accompanying drawings.

First, FIGS. 1 to 4 show an underbody 1 for an electric vehicle according to the present invention.

Figure 1:
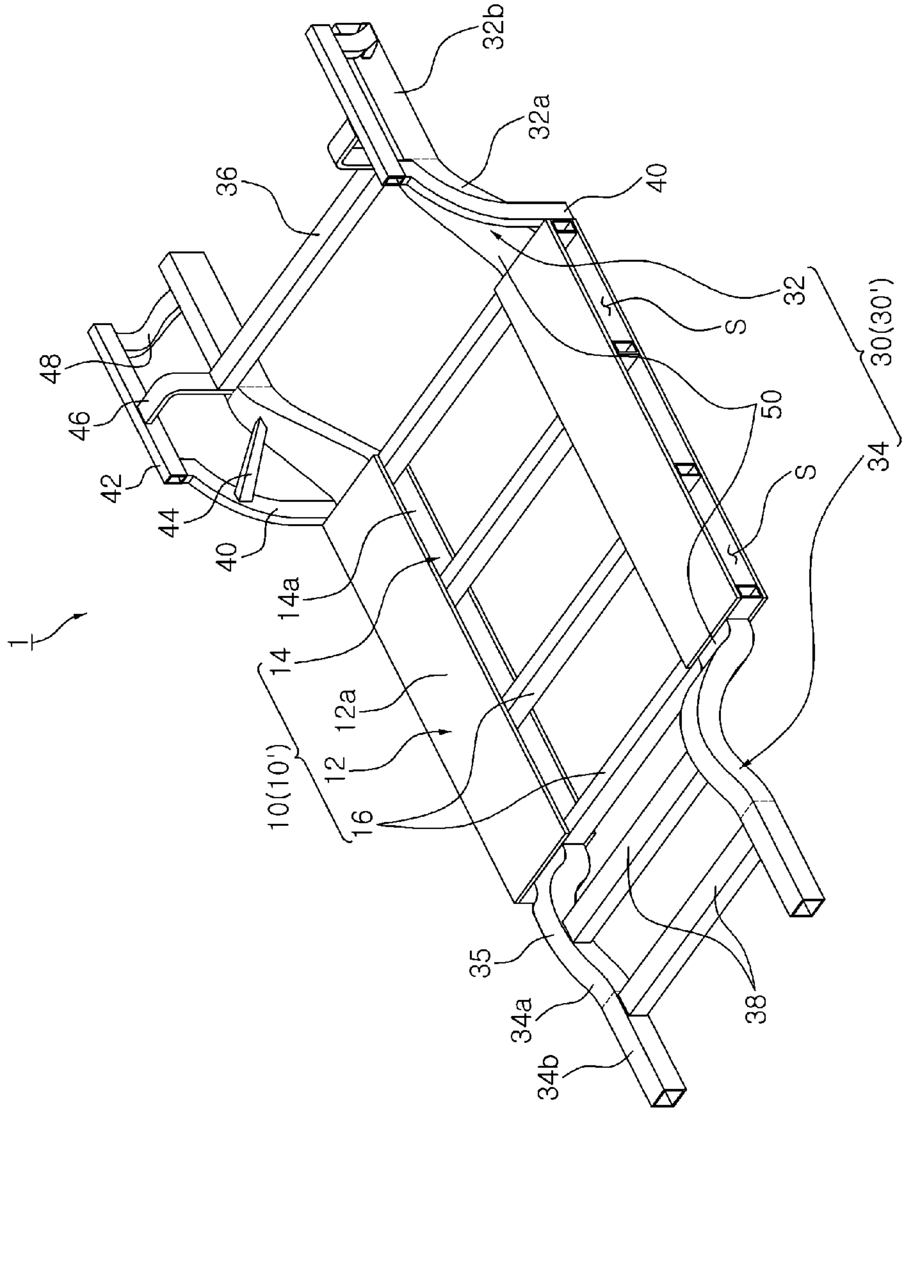
FIG. 1 is a schematic perspective view of an underbody for an electric vehicle according to the present invention.
Figure 2:
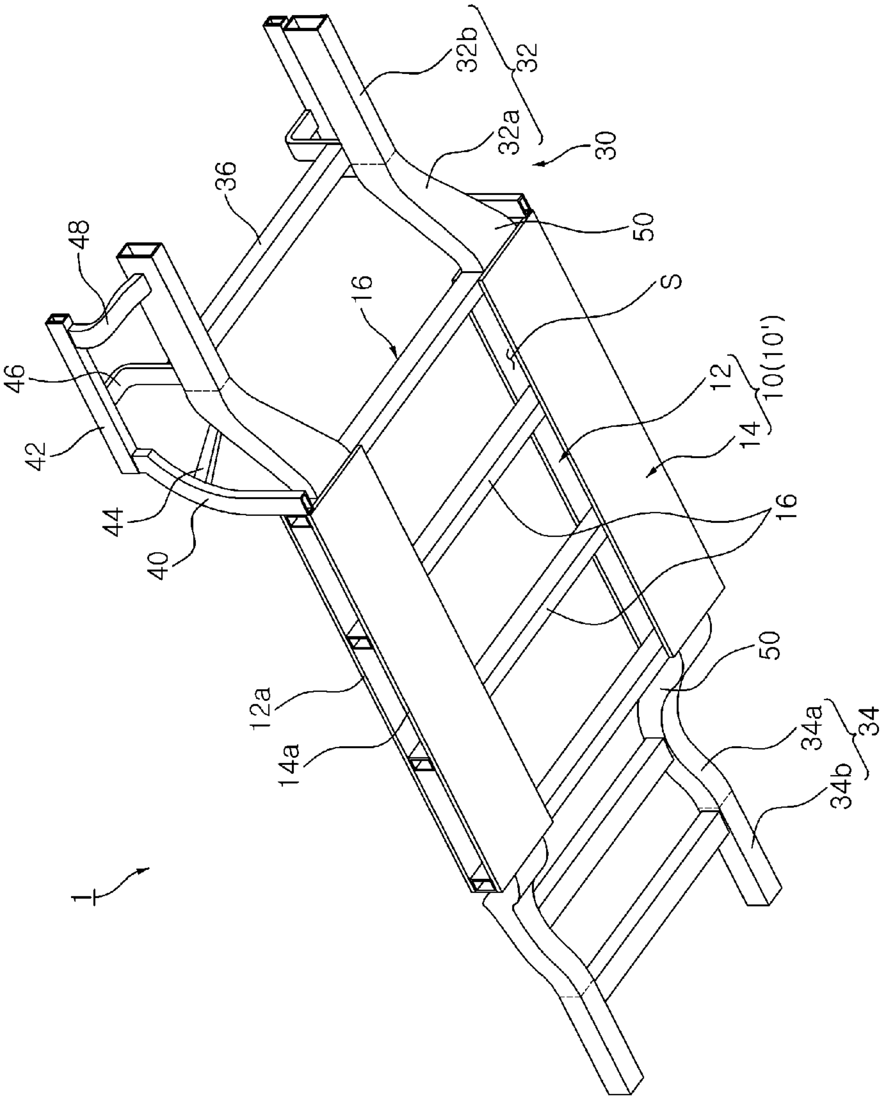
FIG. 2 is a bottom perspective view of the underbody for an electric vehicle in FIG. 1.
Figure 3:
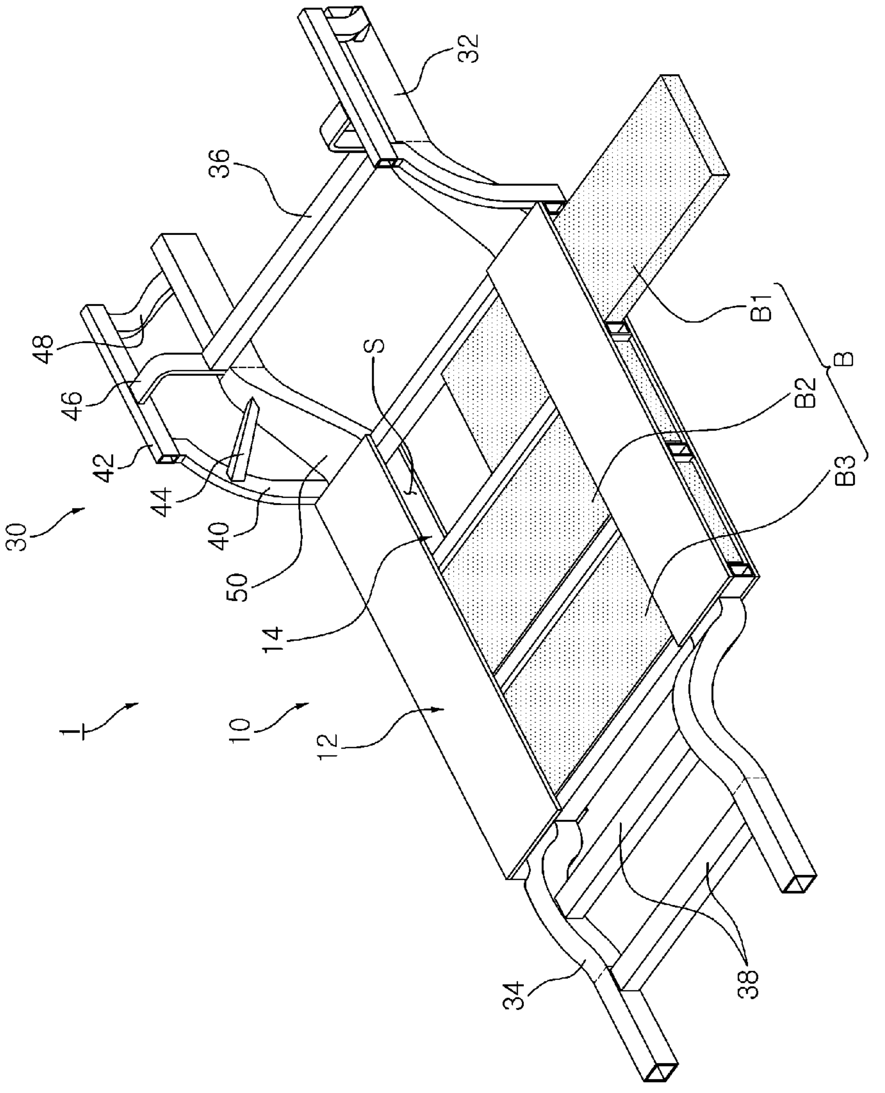
FIG. 3 is a schematic perspective view of the underbody for an electric vehicle in FIG. 1 showing selective mounting of multiple separate batteries.
Figure 4:
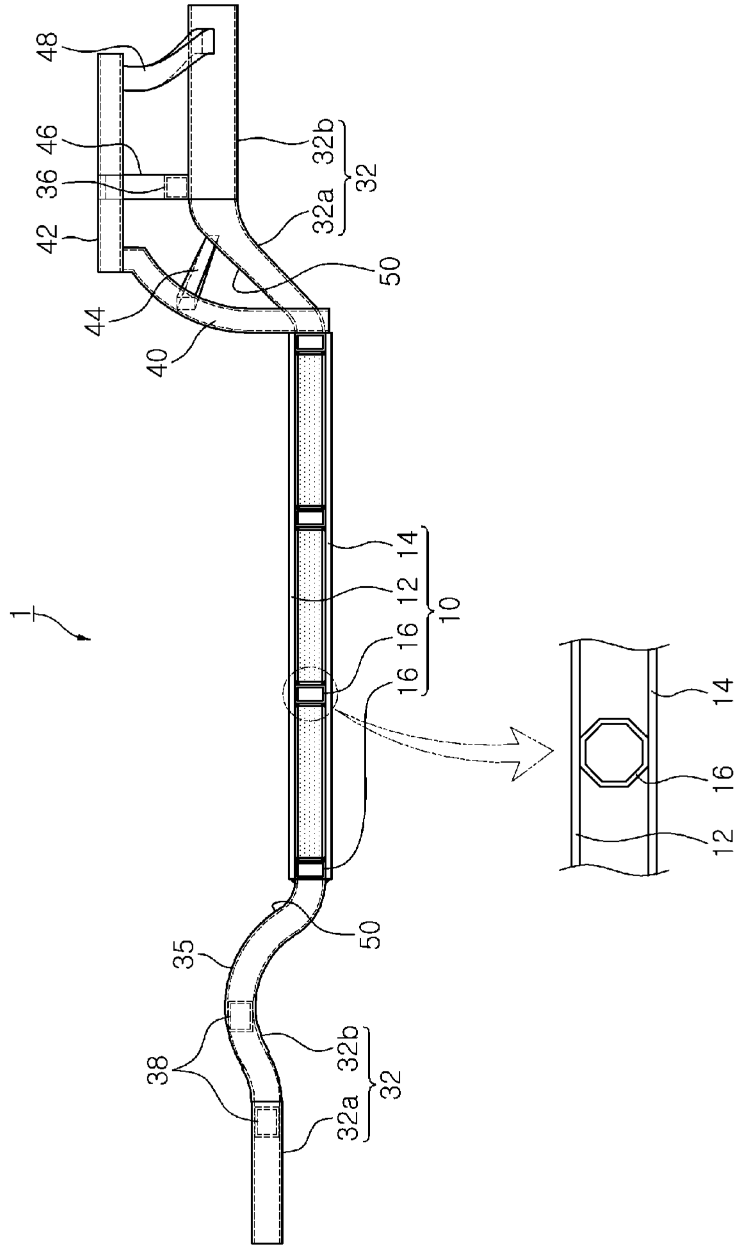
FIG. 4 is a frontal structural view of the underbody for an electric vehicle of FIG. 3.

For example, as shown in FIGS. 1, 2, and 4, an underbody 1 for an electric vehicle according to an embodiment of the present invention allows for multiple, separate, and selective mounting of a battery B (collectively denoting multiple separately mountable batteries B1, B2, B3 . . . in FIG. 3), and may include a multiply divided battery mounting portion 10 provided as a portion of the underbody, and an underbody portion 30' linked to the battery mounting portion 10 and provided as another portion of the underbody, so as to lighten the underbody.

Here, while the battery B is schematically represented in the present embodiment and in the drawings, and it may also be provided as a unit battery pack including electrical connecting components enabling electrical charging.

Also, in another embodiment of an underbody for an electric vehicle according to the present invention, there may be provided a floor portion 10' and a reinforcing underbody portion 30 connected to the floor portion 10' and including at least a partial extended portion 50 provided to increase the strength of the underbody to thus allow for the reinforcement of strength thereof.

Accordingly, an underbody 1 for an electric vehicle of the present invention enables an overall reduction in weight, and allows for the selective mounting of multiple unit batteries (B1, B2, B3 . . . ) accompanied by varying capacity (as shown in FIG. 3), unlike conventional batteries that are mounted as integrated packs. Thus, as described above, it is possible to mount batteries such that their weight corresponds to the projected travel distance of the vehicle.

As a result, the mounting of batteries beyond what is required is avoided, and the electric vehicle configured with the underbody of the present invention provides the economical advantage of preventing needless travel costs from being incurred by increased electrical consumption due to heavy loads.

Moreover, the electric vehicle 1 of the present invention is configured of a (strong) reinforced underbody portion 30 that is capable of strength reinforcement against bending and twisting, as well as front, rear, and side impacts, as will be described in detail below.

Thus, the underbody for an electric vehicle of the present invention can satisfy both the economic conditions of cost reduction and the safety conditions for improving driver protection by means of the vehicle itself.

However, in the description of the present embodiment, the underbody portion 30' in FIGS. 1 to 4 is described as a reinforcing underbody portion 30 including at least a partial extending portion 50, and the floor portion 10' is described as a multiply divided battery mounting portion 10.

Next, as shown in FIGS. 1 to 4, the multiply divided battery mounting portion 10 of the present invention may be provided including an upper floor member and a lower floor member 12 and 14, and a plurality of floor cross members 16 bonded between the upper floor member and the lower floor members 12 and 14 with predetermined intervals therebetween, so as to define a multiply divided sliding mounting space S for a battery B.

Figure 6:
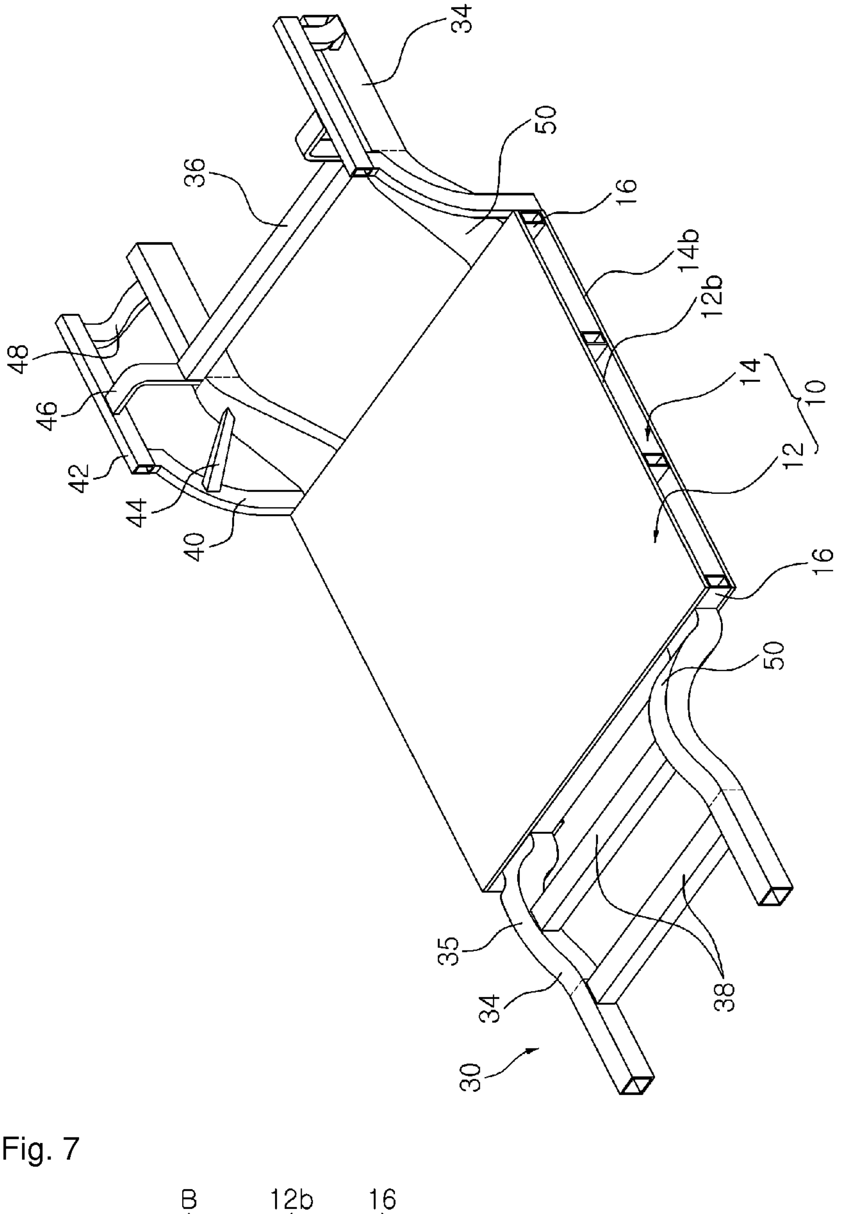
FIG. 6 is a schematic perspective view of another underbody for an electric vehicle according to the present invention.
Figure 8:
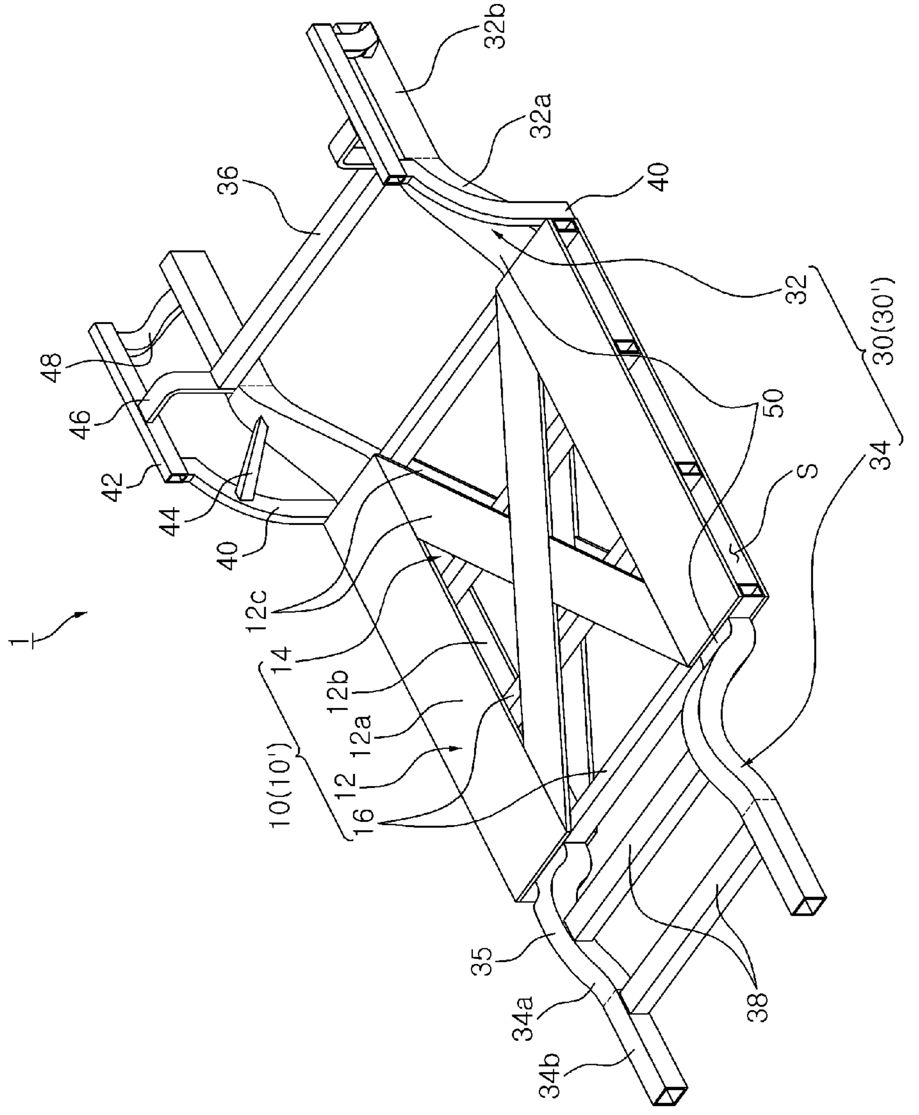
FIG. 8 is a schematic perspective view of another underbody for an electric vehicle according to the present invention.

Here, the upper and lower floor members 12 and 14, as shown in FIGS. 1, 6, and 8, may be provided in the form of plate-shaped divided floor members 12*a* and 14*a,* allotted side by side in order to be lighter, or integrated floor members 12*b* and 14*b* for strength reinforcement.

Whether such integrated or divided floor members should be used towards lightening or strength-reinforcing of an electric vehicle can be determined according to design conditions in view of the vehicle'size, etc.

Also, the floor cross members 16 between the upper and lower floor members are bonded in a predetermined pattern (i.e., equidistantly, as shown in FIGS. 1 and 4) to reinforce strength retention and reduce weight.

The floor cross members actually define a multiply divided battery mounting space S, and enable the batteries to be mounted or replaced by simply being slid after the vehicle door is opened, for example.

Specifically, many of the batteries (i.e., B1, B2, B3 . . . ) may be mounted in the multiply divided battery mounting space S, and as shown in FIG. 3, the battery mounting spaces S may be formed to accommodate the mounting of about 3 to 5 batteries.

The 3 to 5 mounting spaces S may be formed by adjusting the spaces between the bonded floor cross members 16 between the upper and lower floor members.

For example, if the number of batteries (i.e., B1, B2, and B3 . . . ) that are multiply divided and mounted is too large (greater than 5, for example), the limited overall battery mounting space is overly divided so that charge capacities of unit batteries mounted in the unit spaces become too small and make the range of travel possible with the unit batteries unsuitable; and conversely, if the number of unit batteries is less than 3 (2, for example), there is no merit for multiply dividing and selective mounting batteries.

Thus, mounting about 3 to 5 unit batteries (i.e., B1, B2 and B3 . . . ) in mounting spaces of an electric vehicle of the present invention may be suitable.

However, the most suitable number of multiply divided batteries, in consideration of the balance of an underbody may be an odd number of about 3 or 5.

Also, it is not necessary to make all the batteries that are multiply and dividedly mounted replaceable. That is, when 3 batteries B1, B2, and B3 are mounted in an electric vehicle as shown in FIG. 3, the central battery B2 is not replaced and mounted, after which the battery pack is bolted on and fixed between the upper and lower floor members. Thus, the battery, or the battery clad with an outer casing, may provide strength as a reinforcing member between the floor members.

Furthermore, while not shown in a separate drawing, not only is selective multiply divided battery mounting possible in an underbody of an electric vehicle according to the present invention, a fixed battery (not shown) that is used as an electric vehicle's main battery (i.e., a non-replaceable battery pack) may have its casing or housing provided at the rear side of the underbody portions 30 and 30' and in this case, the batteries B1, B2, B3 that are multiply divided and selectively mounted according to the present invention may all be used in the form of replaceable batteries.

Specifically, the basic electric capacity of an electric vehicle is set by a fixed main battery, and as described above, the remaining replaceable batteries, mounted in multiple divided form in consideration of travel range, are used in plural.

For shorter travel distances, of course, the use of only replaceable batteries is possible.

In short, the underbody for an electric vehicle of the present invention allows for more diverse battery operation in an electric vehicle.

Thus, the fixed, non-replaceable main battery (not shown) is not always required. For example, with the development of battery technology, only the multiply divided batteries of the present invention may be required to satisfy the desired travel range for an electric vehicle.

Such fixed batteries of the present invention may be provided where a conventional fuel tank of a vehicle is normally located (that is, for the underbody 1 of the present invention, at the rear side member 34 and at the bottom of the cross member 36 connecting the former).

Next, with reference to FIG. 8, upper and lower connecting members 12*c* are further bonded in cross configuration or lattice configuration (not shown) between at least the floor member divided body portions 12*a* and 14*a*. The upper and lower connecting members may be plates.

The floor cross members 16 may be provided as shaped steel members having four sides in a cross-section thereof, with a hollow void therein, such that lightweight and strength may be retained after the bonding thereof.

For example, as shown in FIG. 4, the floor cross members 16 bonded between the upper and lower floor members 12 and 14 have 4 or more (for example, 6) sides in a cross section thereof, in order to retain strength.

These cross members having 4 or 6 sides in a cross section thereof are able to maintain strength against twisting or bending.

Figure 5:
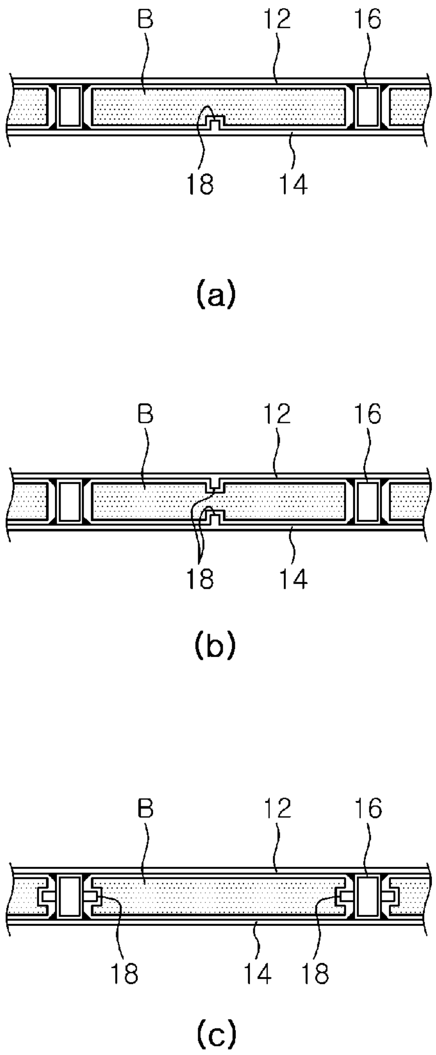
FIGS. 5(*a*) to 5(*c*) are partial views showing a battery sliding mounting structure of an underbody according to the present invention.

As shown in FIGS. 5*a* to 5*c*, in an underbody 1 for an electric vehicle of the present invention, guide portions 18 may be provided for guiding a sliding mount of a battery B on at least one of the upper and lower floor members 12 and 14 or the floor cross members 16.

The guide portions 18 may be provided in a state of square bars bonded to members. However, the battery (pack housing case) requires a slot (not identified with a reference numeral) in which a guide is inserted, so as to fit the guide portions.

Accordingly, for multiply divided selective battery mounting according to the present invention, the guide portions 18 may conveniently and uniformly secure space in which the batteries are mounted, and the guide portions may regularly perform electrical connections for the battery packs.

Figure 7:
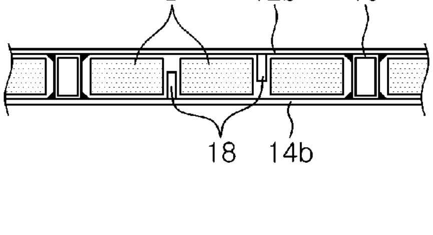
FIG. 7 is a partial view showing a battery mounting structure of the underbody in FIG. 6.

Next, with reference to FIG. 7, when the upper and lower floor members are provided integrally, the guide portions 18 may be arranged in zigzag intersecting form so as to allow for additional multiply divided battery mounting.

Therefore, an underbody for an electric vehicle of the present invention has a capacity that is distributed, and enables a suitable number of batteries to be mounted in accordance with travel range, which will make vehicle weight favorable and allow only optimized travel distance costs to be spent.

Next, with regard to an auxiliary underbody 30 of an underbody of an electric vehicle according to the present invention that improves strength against twisting or bending, and against impacts, as shown in FIGS. 1 to 4, front and rear side members 32 and 34 are provided bonded and extending on both side cross members 16 on the multiply divided battery mounting portion 10 provided as a floor portion 10', and have an expanding portion 50 formed on at least a portion thereof to improve strength.

Specifically, the side members are provided as shaped steel members that are hollow in order to reduce weight, and may be provided as curved portions for reinforcing against bending and as parallel portions for mounting vehicle auxiliary components.

As shown by the dotted lines in FIG. 1, the side members may be integrally formed via hydro forming, or may be provided by being welded (along the dotted lines) by means of a stepping process.

However, the extending portion 50 of the side members for expanding area are provided at the bonded portion side of the floor cross members 16 that are bonded to both sides of the upper and lower floor members.

That is, because the extending portion 50 of the side members allow for the expansion of at least a contact area of the floor cross members and especially of a bonding area, the bonding strength is increased, which enables an overall reinforcement in strength of the underbody.

Also, the extending portion 50 expands the unit area of a member and makes its impact resistance performance good.

Specifically, because the side members include curved portions, specially umbellar curved portions represented by reference numeral 35 in FIG. 1, strength against twisting and bending can be further enhanced.

Next, with reference to FIGS. 1 to 4, front and rear cross members 36 and 38, which are shaped steel members having hollow interiors to increase strength against twisting, are respectively connected and bonded to the front side member 32 and rear side member 34 of the underbody for an electrical vehicle of the present invention.

Here, the front cross member 36 may be provided as a motor mounting member capable of fastening and mounting a motor of an electric vehicle to a bottom. Also, the cross members may make performance against impacts good when the motor is mounted.

Further, a motor controller may be mounted on the cross member 36. Additionally, the curved portions of the side members provide installation space for wheels mounted on the bottom of the underbody.

Furthermore, at the front side member 32 of the underbody 1 of an electric vehicle of the present invention, a pillar member 40 is bonded, to which horizontal side upper members 42 are bonded on either side thereof, and a dash cross side member 44 may be connected and bonded between the pillar member and front side member 32.

At the same time, a shock absorber member 46 and side connecting member 48 are bonded between the side upper member 42 and the front side member 32 (which are curved and facilitate assembly of the shock absorber member).

Accordingly, in the underbody 1 for an electric vehicle of the present invention, a front portion (on which a motor is mounted and many parts related to a driving portion according to the motor are mounted) has related auxiliary components that are mutually crossed and bonded, so that the front body is reinforced in strength and the mounting of the auxiliary components is made easy in order to improve assemblability.

As described above, in an underbody 1 for an electric vehicle of the present invention, each member configuring each battery multiply divided mounting portion 10 (floor portion 10') and reinforcing underbody portion 30 (underbody portion 30') are provided as hollow, shaped steel members to reduce the overall weight of the underbody, may be manufactured and assembled through hydro forming or stepping, etc. as required, and may be bonded and assembled through basic bonding techniques for automotive assembly.

Additionally, because the many members of an underbody of the present invention are designed to facilitate the assembly of auxiliary components such as motors and shock absorbers, part assemblability is improved.

Figure 9:
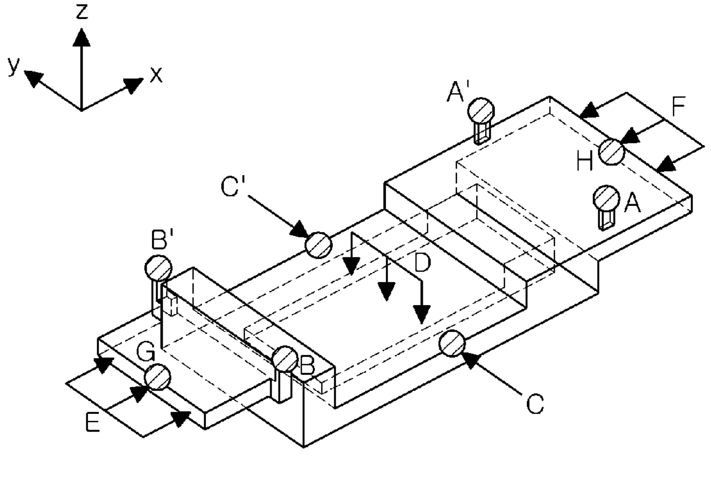
FIG. 9 is a conceptual view of a simulation showing topology optimization conditions for an underbody for an electric vehicle according to the present invention.

As shown in FIG. 9, an electric vehicle 1 of the present invention may be provided through topology optimization, and each of A to H in FIG. 9 for example represent points or directions for analyzing changes in bending and twisting, and strength against impacts in front, rear, and side directions.

An underbody 1 for an electric vehicle according to the present invention may, through topology optimization, allow the acquiring of strength against bending and twisting, as well as impacts in various directions, and may realize topology optimization conditions that enable multiply divided and selective mounting of batteries.

While the present invention has been shown and described in connection with the exemplary embodiments, it will be apparent to those skilled in the art that modifications and variations can be made without departing from the spirit and scope of the invention as defined by the appended claims.

As described above, an underbody for an electric vehicle of the present invention is reinforced for strength against bending, twisting, and impacts from various directions (through optimized design), and enables selective and separate mounting of multiple batteries, such that a very economical electrical vehicle may be provided.

The invention claimed is:

1. An underbody for an electric vehicle, comprising:

a multiply divided battery mounting portion enabling multiply divided and selective mounting of batteries, and forming a portion of the underbody; and an underbody portion connected to the battery mounting portion and forming another portion of the underbody, wherein the multiply divided battery mounting portion comprises:

an upper floor member and a lower floor member defining a battery sliding mounting space; and a plurality of floor cross members bonded between the upper and lower floor members with predetermined intervals therebetween, and defining at least one battery mounting space, for maintaining strength, wherein the underbody portion is a reinforcing underbody portion comprising at least a partial extending portion, wherein the reinforcing underbody portion comprises a front and rear side member bonded to and extending from both sides of a multiply divided battery mounting portion provided as a floor portion, the front and rear side member comprising an extending portion formed on at least a portion thereof for reinforcing strength, and wherein the side member is bonded to either side floor cross member provided on the multiply divided battery mounting portion provided as a floor portion, and comprises a curved portion for reinforcing strength against bending and a horizontal portion for mounting auxiliary components, and the extending portion is provided at the bonding portion of the floor cross member.

2. The underbody of claim 1, wherein the floor cross members bonded between the upper and lower floor members are formed to have at least four sides in a cross-section thereof, for maintaining strength.

3. The underbody of claim 1, further comprising a guide portion for guiding a battery sliding mount on at least one of the upper and lower floor members or the floor cross members.

4. The underbody of claim 1, wherein the upper and lower floor members are formed as divided body portions or integrated body portions.

5. The underbody of claim 4, further comprising a connecting member bonded between the divided body portions.

6. The underbody of claim 1, wherein the battery mounting space is formed to accommodate the mounting of 3 to 5 batteries therein.

7. The underbody of claim 1, wherein a plurality of batteries are mounted in the battery mounting space of the multiply divided battery mounting portion, and at least one of the batteries is fixed for providing strength reinforcement between the floor members.

8. The underbody of claim 1, further comprising at least one replaceable battery and one multipurpose fixed battery mounted on a multiply divided battery mounting portion that is a rearward floor portion of the underbody portion or a reinforcing underbody portion.

9. The underbody of claim 1, further comprising one or more cross members connected to the front side member and the rear side member for reinforcing respective strength thereof against twisting, wherein the front cross member is provided as a motor mounting member.

10. The underbody of claim 9, wherein the front side member comprises:

a pillar member bonded thereto and having a side upper member bonded thereto; and a dash cross side member further connected between the pillar member and the front side member.

11. The underbody of claim 10, further comprising a shock absorber member and side connecting member bonded between the side upper member and the front side member.

12. The underbody of claim 11, wherein the members comprised by the underbody are formed as shaped steel members having hollow interiors for reduced weight, and are selectively hydro formed.

13. The underbody of claim 1, wherein the members comprised by the underbody are formed as shaped steel members having hollow interiors for reduced weight, and are selectively hydro formed.

* * * * *